US011822635B2

(12) United States Patent
Jin et al.

(10) Patent No.: US 11,822,635 B2
(45) Date of Patent: Nov. 21, 2023

(54) METHOD FOR PERFORMING BIOMETRIC INFORMATION-RELATED AUTHENTICATION ON BASIS OF STATE OF IMAGE INCLUDING BIOMETRIC INFORMATION ACQUIRED USING BIOMETRIC SENSOR, AND ELECTRONIC DEVICE IMPLEMENTING SAME

(71) Applicant: Samsung Electronics Co., Ltd., Suwon-si (KR)

(72) Inventors: Yunjang Jin, Suwon-si (KR); Suna Kim, Suwon-si (KR); Seyoung Yang, Suwon-si (KR); Bongjae Rhee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 512 days.

(21) Appl. No.: 17/250,315

(22) PCT Filed: Jul. 3, 2019

(86) PCT No.: PCT/KR2019/008092
§ 371 (c)(1),
(2) Date: Dec. 31, 2020

(87) PCT Pub. No.: WO2020/009452
PCT Pub. Date: Jan. 9, 2020

(65) Prior Publication Data
US 2021/0286866 A1    Sep. 16, 2021

(30) Foreign Application Priority Data
Jul. 4, 2018  (KR) .................. 10-2018-0077950

(51) Int. Cl.
*G06F 21/32* (2013.01)
*G06V 40/13* (2022.01)
(Continued)

(52) U.S. Cl.
CPC ............ *G06F 21/32* (2013.01); *G06V 10/993* (2022.01); *G06V 40/1306* (2022.01);
(Continued)

(58) Field of Classification Search
CPC ................ G06F 21/32; G06V 40/1318; G06V 40/1365; G06V 40/1329; G06V 40/1306; G06V 10/993
(Continued)

(56) References Cited

U.S. PATENT DOCUMENTS 6,330,345 B1 * 12/2001 Russo ................ G06V 40/1347
358/463
9,235,746 B2    1/2016 Jung et al.
(Continued)

FOREIGN PATENT DOCUMENTS

CN    107454963 A    12/2017
JP    2010-277315 A   12/2010
(Continued)

OTHER PUBLICATIONS

International Search Report and Written Opinion of the International Searching Authority in connection with International Application No. PCT/KR2019/008092 dated Oct. 23, 2019, 10 pages.
(Continued)

*Primary Examiner* — Thanh T Le

(57) ABSTRACT

An electronic device includes a display, a fingerprint sensor positioned under a specified area of the display, and a processor. The processor is configured to obtain a first image based on a first input, perform authentication associated with biometric information, when a state of the first image meets a first condition, obtain a second image using the fingerprint sensor, when the state of the first image meets a second condition, adjust a setting of the fingerprint sensor, obtain a third image using the fingerprint sensor adjusted from the
(Continued)

first value to a second value, and perform authentication associated with the biometric information based on the second image and the third image.

14 Claims, 7 Drawing Sheets

(51) Int. Cl.
  G06V 40/12 (2022.01)
  G06V 10/98 (2022.01)
(52) U.S. Cl.
  CPC ...... G06V 40/1318 (2022.01); G06V 40/1329 (2022.01); G06V 40/1365 (2022.01)
(58) Field of Classification Search
  USPC .......................................................... 713/186
  See application file for complete search history.

(56) References Cited

U.S. PATENT DOCUMENTS

| | | | |
|---|---|---|---|
| 10,140,499 B1* | 11/2018 | Schwartz | ............. G06F 3/0488 |
| 10,235,551 B2 | 3/2019 | Lu et al. | |
| 10,268,865 B2 | 4/2019 | Sun et al. | |
| 2012/0062720 A1* | 3/2012 | Choi | .................... G06V 10/993 |
| | | | 348/78 |
| 2015/0086090 A1 | 3/2015 | Jung et al. | |
| 2015/0169136 A1* | 6/2015 | Ganti | .................... G06F 3/0436 |
| | | | 345/177 |
| 2016/0055363 A1* | 2/2016 | Lee | ..................... G06V 40/1306 |
| | | | 382/124 |
| 2017/0323131 A1* | 11/2017 | Lu | ........................... G06V 40/10 |
| 2017/0343341 A1* | 11/2017 | Pang | .................. G06V 40/1306 |
| 2018/0068151 A1 | 3/2018 | Sun et al. | |
| 2018/0088712 A1* | 3/2018 | Kim | ...................... G02F 1/13338 |
| 2018/0267666 A1* | 9/2018 | Park | ..................... G06V 40/1365 |
| 2018/0365470 A1* | 12/2018 | Li | .............................. G06T 5/50 |
| 2019/0018945 A1* | 1/2019 | Zhou | ....................... G06F 21/32 |
| 2021/0174111 A1* | 6/2021 | Im | ...................... G06V 40/1306 |

FOREIGN PATENT DOCUMENTS

| | | |
|---|---|---|
| KR | 10-2013-0024501 A | 3/2013 |
| KR | 10-2014-0138541 A | 12/2014 |
| KR | 10-1468381 B1 | 12/2014 |
| KR | 10-2015-0034832 A | 4/2015 |

OTHER PUBLICATIONS

Request for the Submission of an Opinion dated Sep. 9, 2022 in connection with Korean Patent Application No. 10-2018-0077950, 21 pages.

* cited by examiner

METHOD FOR PERFORMING BIOMETRIC INFORMATION-RELATED AUTHENTICATION ON BASIS OF STATE OF IMAGE INCLUDING BIOMETRIC INFORMATION ACQUIRED USING BIOMETRIC SENSOR, AND ELECTRONIC DEVICE IMPLEMENTING SAME

CROSS-REFERENCE TO RELATED APPLICATIONS

This application is a 371 National Stage of International Application No. PCT/KR2019/008092, filed Jul. 3, 2019, which claims priority to Korean Patent Application No. 10-2018-0077950, filed Jul. 4, 2018, the disclosures of which are herein incorporated by reference in their entirety.

BACKGROUND

1. Field

Various embodiments of the disclosure relate to an electronic device including a biometric sensor.

2. DESCRIPTION OF RELATED ART

An electronic device, such as a smartphone, a tablet PC, or a smart watch, may be equipped with various sensors. For example, the electronic device may collect biometric information of a user by means of a fingerprint sensor, a biometric sensor, or the like. The electronic device may analyze the information collected by means of the sensor and may provide the user with useful information.

SUMMARY

An electronic device according to an existing technology may include a fingerprint sensor in its front surface or its rear surface. Recently, a type (an in-display type) where the fingerprint sensor is mounted on a part of a display area has attempted. The fingerprint sensor of the in-display type may be implemented in an optical scheme, an ultrasonic scheme, or the like.

When the electronic device including the fingerprint sensor of the in-display type operates in the ultrasonic scheme, a fingerprint recognition error may occur as a protective film is attached. When the fingerprint recognition error occurs, the electronic device may operate in a manner such that a user waits for a certain time to provide the user with inconvenience.

In accordance with an aspect of the disclosure, an electronic device is provided. The electronic device may include a display, a fingerprint sensor positioned under a specified area of the display, and a processor. The processor may be configured to obtain a first image associated with an external object corresponding to a first input using the fingerprint sensor set to a first value, based on the first input associated with biometric information through the specified area, when a state of the first image meets a first condition, perform authentication associated with the biometric information based at least on the first image, and, when the state of the first image meets a second condition, obtain a second image obtained through the specified area using the fingerprint sensor, during a first time when there is no input associated with the biometric information, adjust a setting of the fingerprint sensor, obtain a third image obtained through the specified area, using the fingerprint sensor adjusted from the first value to a second value, and perform authentication associated with the biometric information based on the second image and the third image.

When a fingerprint of a user is recognized again according to a fingerprint recognition error, an electronic device according to various embodiments of the disclosure may reduce the number of frames of a background image where there is no fingerprint to capture the background image. As a result, the user may complete the capture of the background image, during a time when he or she moves the location of his or her finger on the fingerprint sensor.

The electronic device according to various embodiments of the disclosure may reduce a time when the user waits unnecessarily, in a fingerprint re-recognition process.

When a path of a sound wave is added as a protective film is added, the electronic device according to various embodiments of the disclosure may ensure a background image at a quick time, thus enhancing fingerprint recognition efficiency.

DETAILED DESCRIPTION

Figure 1:
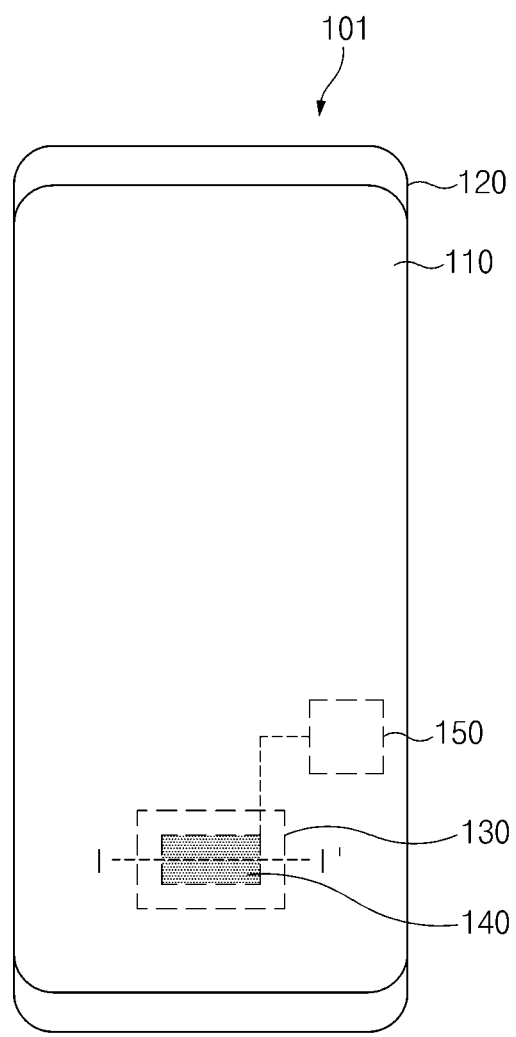
FIG. 1 illustrates an electronic device for recognizing an external object using a partial area of a display according to various embodiments.

Hereinafter, various embodiments of the present disclosure will be described with reference to the accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the disclosure disclosed herein, the expressions "have", "may have", "include" and "comprise", or "may include" and "may comprise" used herein indicate existence of corresponding features (for example, elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms are used only to distinguish an element from another element and do not limit the order and/or priority of the elements. For example, a first user device and a second user device may represent different user devices irrespective of sequence or importance. For example, without departing the scope of the present disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to the other element or an intervening element (for example, a third element) may be present. In contrast, when an element (for example, a first element) is referred to as being "directly coupled with/to" or "directly connected to" another element (for example, a second element), it should be understood that there are no intervening element (for example, a third element).

According to the situation, the expression "configured to" used herein may be used as, for example, the expression "suitable for", "having the capacity to", "designed to", "adapted to", "made to", or "capable of". The term "configured to (or set to)" must not mean only "specifically designed to" in hardware. Instead, the expression "a device configured to" may mean that the device is "capable of" operating together with another device or other components. CPU, for example, a "processor configured to (or set to) perform A, B, and C" may mean a dedicated processor (for example, an embedded processor) for performing a corresponding operation or a generic-purpose processor (for example, a central processing unit (CPU) or an application processor) which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), MP3 players, mobile medical devices, cameras, and wearable devices. According to various embodiments of the present disclosure, the wearable devices may include accessories (for example, watches, rings, bracelets, ankle bracelets, glasses, contact lenses, or head-mounted devices (HMDs)), cloth-integrated types (for example, electronic clothes), body-attached types (for example, skin pads or tattoos), or implantable types (for example, implantable circuits).

Hereinafter, electronic devices according to an embodiment of the present disclosure will be described with reference to the accompanying drawings. The term "user" used herein may refer to a person who uses an electronic device or may refer to a device (for example, an artificial electronic device) that uses an electronic device.

FIG. 1 illustrates an electronic device for recognizing an external object using a partial area of a display according to various embodiments. In FIG. 1, it is described that the external object is a fingerprint of a user, but not limited thereto.

Referring to FIG. 1, an electronic device 101 may include a display (or a display module) 110 and a body part (or a housing or a frame) 120.

The display 110 may include, for example, a liquid crystal display (LCD), a light emitting diode (LED) display, an organic light emitting diodes (OLED) display, a microelectromechanical systems (MEMS) display, or an electronic paper. The display 110 may display, for example, a variety of content (e.g., a text, an image, a video, an icon, a symbol, and/or the like) to a user. The display 110 may include a touch screen and may receive, for example, a touch, a gesture, proximity, or a hovering input using an electronic pen or a part of the user's body. The display 110 may include a glass cover (or a window panel) exposed to the outside and various layers therein.

According to various embodiments, the display 110 may be positioned to occupy all (bezel-less) or most of a front surface of the electronic device 101 (a surface where primary content is output on the display 110). In an embodiment, the display 110 may be a form enlarged to a side (e.g., an upper/lower/left/right surface) of the electronic device 101.

According to various embodiments, a fingerprint recognition area 130 may be included in at least a part of the display 110 (in-display). When a user arranges his or her finger on the fingerprint recognition area 130, the fingerprint recognition area 130 may be a region for collecting fingerprint information for performing user authentication, using a sound wave reflected from a fingerprint.

According to various embodiments, when the user holds the electronic device 101 in a vertical mode (or a portrait mode) using his or her one hand, the fingerprint recognition area 130 may be a location where a thumb of the user is easily positioned.

According to various embodiments, when a fingerprint recognition function is not performed, the fingerprint recognition area 130 may output content, such as a text or an image, to be the same as another part of the display 110. When the fingerprint recognition function is executed, the fingerprint recognition area 130 may be displayed in a different color from another region of the display 110 or may be changed to a light emitting state (a state where light is generated from a pixel in the display 110).

According to various embodiments, the electronic device 101 may include a fingerprint sensor 140 which recognizes an external object using an ultrasonic wave in the fingerprint recognition area 130.

The fingerprint sensor 140 may generate an ultrasonic wave towards the fingerprint recognition area 130. The fingerprint sensor 140 may collect a sound wave from an external object (e.g., a finger of the user) and may convert the collected sound wave into a digital image. For example, the fingerprint sensor 140 may capture a plurality of image frames during a specified time to obtain a background image or an image including a fingerprint of the user. For example, the fingerprint sensor 140 may capture one image frame within about 40 msec using an ultrasonic sound.

According to various embodiments, the fingerprint sensor 140 may change the number of the captured image frames depending on a specific condition. For example, when fingerprint recognition for user authentication proceeds, the fingerprint sensor 140 may capture 7 image frames to obtain a first sensing image. When failing in fingerprint recognition using the first sensing image, the fingerprint sensor 140 may capture 4 image frames less than the number of image frames forming the first sensing image to obtain a second sensing image. After storing the second sensing image in a memory (e.g., a trust zone), the fingerprint sensor 140 may capture 7 image frames to obtain a third sensing image. The number of image frames captured by the fingerprint sensor 140 is illustrative, but not limited thereto.

The fingerprint sensor 140 may deliver an image obtained by removing the second sensing image from the third sensing image to a processor 150. The processor 150 may execute a function associated with payment or security (e.g., payment, banking, lock screen unlocking, or the like), based on the image provided from the fingerprint sensor 140.

The processor 150 may perform a variety of calculation necessary for an operation of the electronic device 101. The processor 150 may run software to control at least one other component (e.g., a hardware or software component) of the electronic device 101 connected to the processor 150 and may perform a variety of data processing and calculation.

According to an embodiment, the processor 150 may generate a signal controlling the fingerprint sensor 140 and may control a fingerprint recognition process of the fingerprint sensor 140. For example, the processor 150 may control the fingerprint sensor 140 to generate an ultrasonic wave for fingerprint recognition and collect a reflective wave reflected from an external object. The processor 150 may perform various functions (e.g., payment, banking, lock screen unlocking, or the like), based on the image provided from the fingerprint sensor 140.

The body part 120 may mount the display 110. The body part 120 may allow an active area of the display 110 to be mainly positioned towards a first surface (a front surface). The body part 120 may include various components (e.g., the processor 150, a memory, a communication circuitry, a battery, a board, or the like) for driving the electronic device 101 therein.

Figure 2:
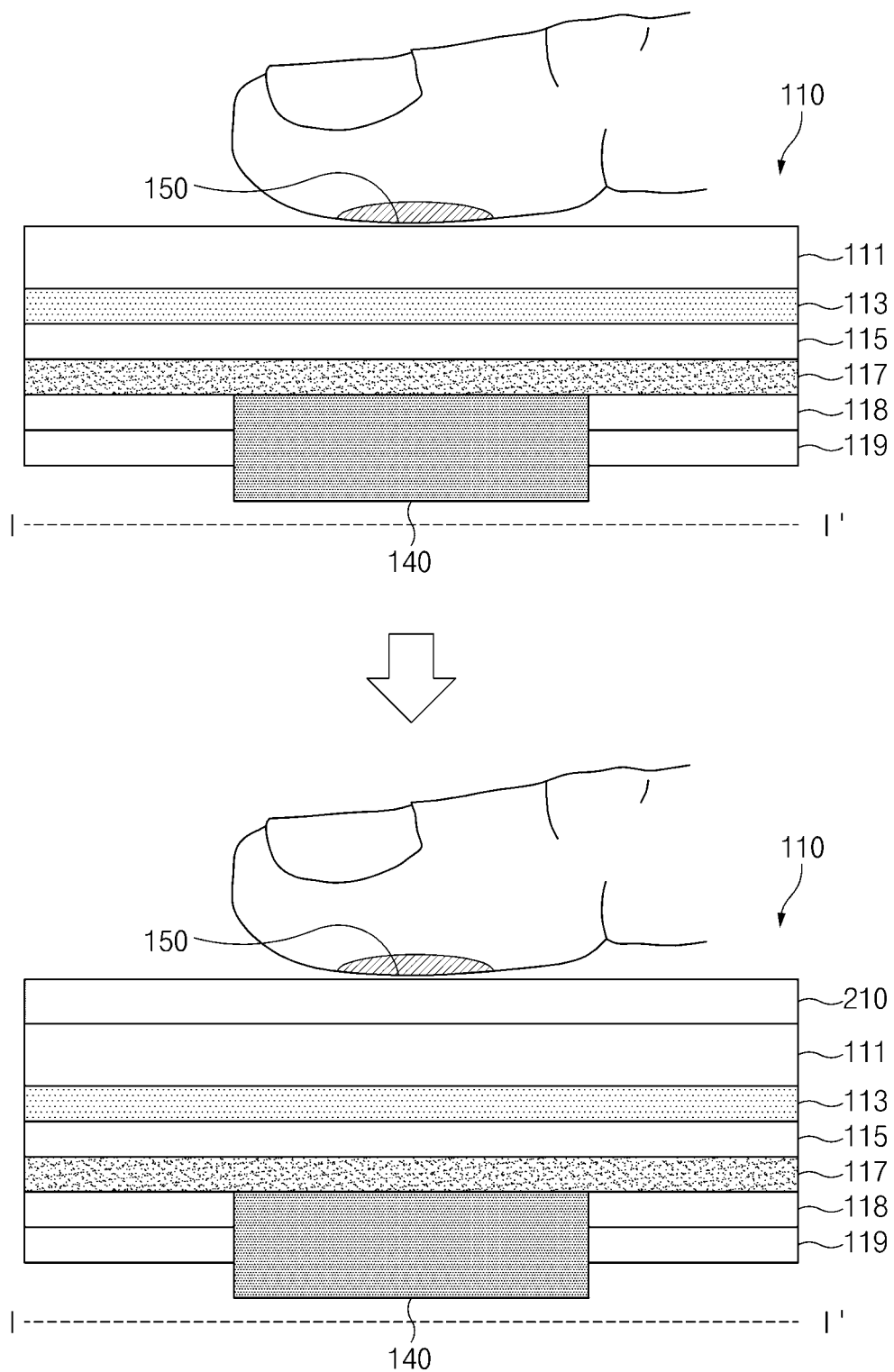
FIG. 2 is a cross-sectional view of a fingerprint recognition area of an electronic device according to various embodiments.

FIG. 2 is a cross-sectional view of a fingerprint recognition area of an electronic device according to various embodiments. FIG. 2 is a cross-sectional view of the I-I' direction of FIG. 1.

Referring to FIG. 2, a display 110 may include various layers. For example, the display 110 may have a structure where a transparent layer (or a window panel or a glass panel) 111, an adhesive layer 113, a polarizing layer 115, a display panel 117, a protective layer 118, a heat radiating layer 119 are successively laminated. FIG. 1 is illustrative, but not limited thereto. The display 110 may add some layers or may exclude some layers. For example, the display 110 may further include a touch panel (not shown).

The transparent layer (or the window panel or the glass panel) 111 may be disposed on an uppermost end of the display 110 (a surface of an electronic device 101). The transparent layer 111 may protect the internal configuration of the display 110. Light generated by the display panel 117 may pass through the transparent layer 111 to be output to the outside.

The adhesive layer 113 may adhere the transparent layer 111 to the polarizing layer 115. For example, the adhesive layer 113 may be implemented as an optically clear adhesive (OCA) film (an adhesive double-sided tape).

The polarizing layer 115 may polarize light incident from the outside to pass light, an electric field of which vibrates along a linear trajectory. The polarizing layer 115 may block light which is not identical to the specified linear trajectory.

The display panel 117 may be a layer which emits light depending to an electrical signal. The display panel 117 may have a shape where a light-emitting device (e.g., an organic electro luminescence (EL)) is deposited on a thin film transistor (TFT) substrate. The TFT substrate may include a TFT device, a metal wire, an insulating film, and the like for driving each pixel of the active area. When holes and electrons are injected from a cathode and an anode, the organic EL may generate light.

The protective layer 118 may be a film layer which protects a rear surface of the display panel 117. The protective layer 260 may prevent the display panel 117 from colliding with a configuration in the electronic device. The heat radiating layer 119 may blocks heat generated by the display panel 117.

According to various embodiments, a fingerprint sensor 140 (or an image sensor) may be mounted on an internal surface of the display 110 (an internal surface corresponding to a fingerprint recognition area 130 of FIG. 1). A surface (a sensing surface) collecting a sound wave of the fingerprint sensor 140 may be disposed to face the display panel 117.

According to an embodiment, the fingerprint sensor 140 may be mounted on a portion where some layers of the rear surface of the display 110 are removed. For example, the fingerprint sensor 140 may be disposed on a region where the protective layer 118 and the heat radiating layer 119 arranged on a lower end of the display panel 117 are removed. The protective layer 118 and the heat radiating layer 119 may form a hole or an opening in a region adjacent to the fingerprint sensor 140.

In FIG. 2, it is illustratively shown that a part of the protective layer 118 and the heat radiating layer 119 is removed and that the fingerprint sensor 140 is mounted, but not limited thereto. For example, the fingerprint sensor 140 may be mounted in a state where the protective layer 118 is removed and where the heat radiating layer 119 is maintained. For another example, as a partial layer of a lower portion of the display panel 117 becomes thinner, the fingerprint sensor 140 may be included in the partial layer. For another example, the fingerprint sensor 140 may be positioned under the heat radiating layer 119 in a state where the protective layer 118 and the heat radiating layer 119 are not removed.

According to an embodiment, the fingerprint sensor 140 may include an ultrasonic wave generating unit and an ultrasonic wave receiving unit. The fingerprint sensor 140 may generate an ultrasonic wave of a specified frequency for fingerprint recognition, by means of the ultrasonic wave generating unit. The fingerprint sensor 140 may collect a reflective sound wave (or a reflective wave) corresponding to the ultrasonic wave of the specified frequency, which is reflected from an external object, by means of the ultrasonic wave receiving unit. The fingerprint sensor 140 may convert the reflective wave into an electrical signal and may generate a digital image based on the electrical signal. The fingerprint sensor 140 may capture a plurality of image frames at a specified time period and may obtain a sensing image based on the captured image frames.

According to various embodiments, the fingerprint sensor 140 may change the number of the captured image frames, depending on various conditions. For example, after entering a fingerprint recognition process, the fingerprint sensor 140 may capture n (e.g., 7) image frames to generate a first sensing image. For another example, after failing in fingerprint recognition, the fingerprint sensor 140 may capture m (e.g., 4) image frames less than n (e.g., 7) image frames to generate a second sensing image.

According to various embodiments, the fingerprint sensor 140 may be electrically connected to a memory capable of storing image data. The memory (e.g., a trust zone) may store image data collected by the fingerprint sensor 140 or image data provided from the processor 150. The image data stored in the memory (e.g., the trust zone) may be data about a background image needed to be removed among the image data collected by the fingerprint sensor 140.

According to various embodiments, a protective film 210 may be attached to a surface of the transparent layer (or the window panel or the glass panel) 111 of the display 110. The protective film 210 may protect the transparent layer (or the window panel or the glass panel) 111. The protective film 210 may be newly attached or replaced in a process of using the electronic device 101. According to a thickness, a material, or the like of the attached protective film 210, a reflective characteristic of an ultrasonic wave output from the fingerprint sensor 140 may be varied (see FIG. 5).

Figure 3:
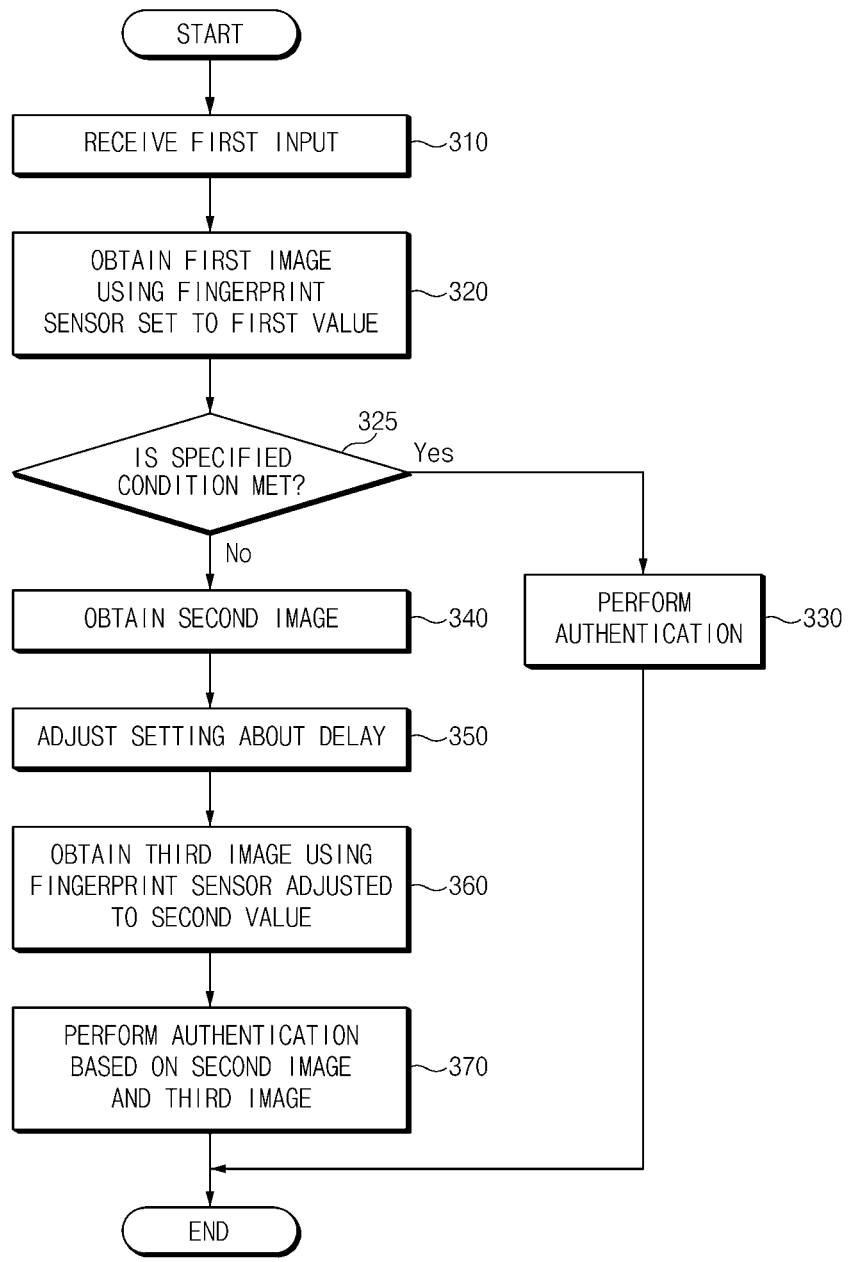
FIG. 3 is a flowchart illustrating a fingerprint recognition process according to various embodiments.

FIG. 3 is a flowchart illustrating a fingerprint recognition process according to various embodiments.

Referring to FIG. 3, in operation 310, a processor 150 may receive a first input in conjunction with biometric information through a fingerprint recognition area 130. When a user arranges a fingerprint of his or her finger, the fingerprint recognition area 130 may be a region for collecting fingerprint information for performing user authentication. According to an embodiment, the fingerprint recognition area 130 may be overlapped at least in part with an active area of the display 110. The first input may be an input where the user puts his or her finger on the fingerprint recognition area 130.

In operation 320, the processor 150 may obtain a first image (hereinafter, a first sensing image) associated with an external object (e.g., the finger of the user) corresponding to the first input using the fingerprint sensor 140 set to a first value, based on the first input. For example, the fingerprint sensor 140 may generate an ultrasonic wave by means of an ultrasonic wave generating unit and may receive a sound wave (a reflective wave), in which the generated ultrasonic wave is reflected from an external object (e.g., the finger of the user, a glass panel, a protective film, or the like), by means of an ultrasonic wave receiving unit. The fingerprint sensor 140 may convert the received reflective wave into an electrical signal to obtain the first sensing image.

According to an embodiment, the first sensing image may be formed based on a plurality of image frames captured during a specified time (e.g., about 1 second). According to another embodiment, the first sensing image may be formed based on a plurality of image frames captured by a specified number (e.g., about 7).

Figure 5:
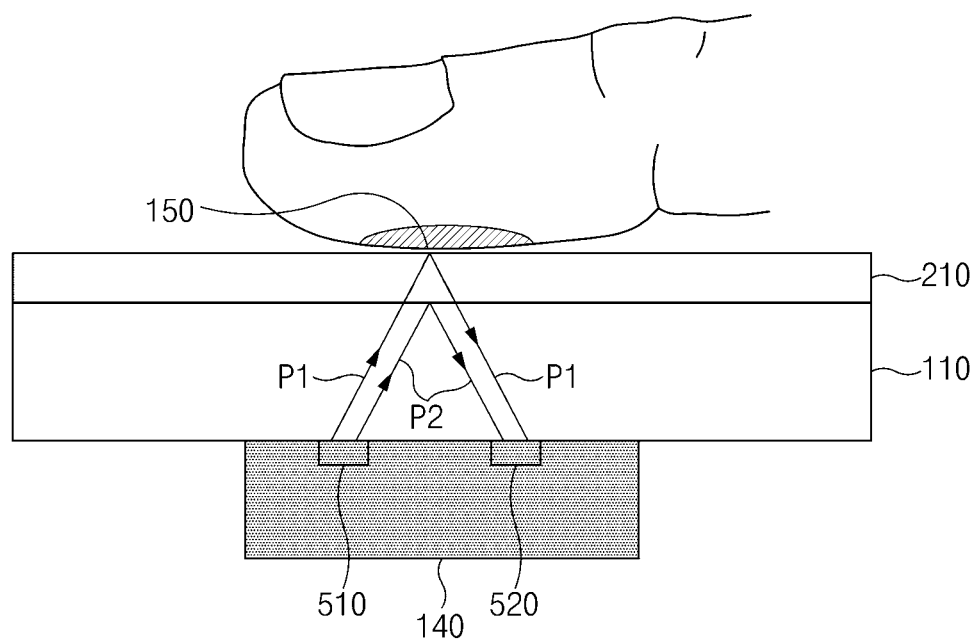
FIG. 5 illustrates reflection of an ultrasonic wave according to attachment of a protective film according to various embodiments.

According to an embodiment, the first value may be a setting value associated with a delay of a sound wave corresponding to a thickness or material of a protective film attached to the display 110 (see FIG. 5).

In operation 325 and operation 330, when a state of the first sensing image meets a first condition, the processor 150 may perform authentication associated with biometric information based at least on the first sensing image.

According to an embodiment, the first specified condition may be a criterion about image quality. The fingerprint sensor 140 may calculate image quality for an image (hereinafter, a background removal image) in which a previously stored background image is removed from the first sensing image. For example, the fingerprint sensor 140 may calculate image quality of the background removal image, based on sharpness, contrast, or the like. The first specified condition may be a condition where the image quality of the background removal image is greater than or equal to (or greater than) a predetermined reference value. When the first specified condition is met, the fingerprint sensor 140 may deliver the first sensing image or the background removal image for the first sensing image to the processor 150.

The processor 150 may perform authentication associated with biometric information, based on the image received from the fingerprint sensor 140. For example, the processor 150 may extract a feature point of the received background removal image and may compare the extracted feature point with fingerprint information stored in a secure area. The processor 150 may execute a function, such as screen unlock, payment, or banking, based on the compared result.

In operation 325 and operation 340, when the state of the first sensing data meets a second condition, the processor 150 may obtain a second image (hereinafter, a second sensing image) obtained through the fingerprint recognition area 130 using the fingerprint sensor 140, during a first time when there is no input associated with biometric information.

According to an embodiment, the second specified condition may be a condition where the image quality of the background removal image is less than (or less than or equal to) the predetermined reference value.

According to an embodiment, in operation 320, when capturing a first number of image frames to obtain the first sensing image, the processor 150 may capture a second number of image frames less than the first number of image frames to obtain the second sensing image. For example, the first sensing image may be generated by capturing about 7 image frames. On the other hand, the second sensing image may be generated by capturing about 4 image frames.

According to various embodiments, the processor 150 may recognize attachment of a protective film 210 attached to the display 110, by means of a separate sensor, and may obtain the second sensing image. For example, when collecting an image having a difference with previously stored light transmissivity over a specified value in a specified condition (e.g., a state where there is no external light source), using a front camera, the processor 150 may determine that the protective film 210 is attached to the display 110. For another example, when receiving a touch input having a difference with previously stored touch sensitivity over a specified value, using a touch panel, the processor 150 may determine that the protective film 210 is attached to the display 110.

The processor 150 may adjust a setting about a delay of a sound wave of the fingerprint sensor 140 from a first value to a second value. When the protective film 210 is attached to a surface of a transparent layer (or a window panel or a glass panel) 111 of the display 110, a path different from a reflective wave reflected from a fingerprint of a user may be formed by a reflective wave reflected from the protective film 210. The processor 150 may calculate a delay value between a first reflective wave reflected from a fingerprint of the user and a second reflective wave reflected from the protective film 210, based on the first sensing image. The processor 150 may adjust a setting value of the fingerprint sensor 140, based on the calculated delay value. In an embodiment, the operation of adjusting the setting about the delay of the sound wave of the fingerprint sensor 140 from the first value to the second value may be performed before operation 340.

According to an embodiment, the processor 150 may determine the second value based on an image obtained in a state where the setting about the delay of the sound wave of the fingerprint sensor 140 is the first value. For example, the processor 150 may analyze the image obtained in the state where the setting about the delay of the sound wave of the fingerprint sensor 140 is the first value and may determine the second value capable of improving quality of the image depending on the analyzed result.

In operation 360, the processor 150 may obtain a third image (hereinafter, a third sensing image) through the fingerprint recognition area 130, using the fingerprint sensor 140 adjusted to the second value.

According to an embodiment, in operation 320, when capturing a first number of image frames to obtain the first sensing image, the processor 150 may capture the same number of image frames as the first number of image frames to obtain a third sensing image. For example, the first sensing image may be generated by capturing about 7 image frames, and the third sensing image may be generated by capturing about 7 image frames.

In operation 370, the processor 150 may perform authentication associated with the biometric information based on the second sensing image and the third sensing image. The processor 150 may perform authentication associated with the biometric information, based on the image received from the fingerprint sensor 140. For example, the processor 150 may extract a feature point of the received background removal image and may compare the extracted feature point with fingerprint information stored in a secure area. The processor 150 may execute a function, such as screen unlock, payment, or banking, based on the compared result.

According to various embodiments, after obtaining the third sensing image, the processor 150 may obtain a fourth image (hereinafter, a fourth sensing image) using the fingerprint sensor 140, during a first time when there is no input associated with biometric information.

According to an embodiment, the number of image frames forming the fourth sensing image may be the same as the number of image frames forming the first sensing image or the third sensing image. For example, each of the first sensing image and the third sensing image may be generated by capturing 7 image frames and the fourth sensing image may be generated by capturing 7 image frames. The fourth sensing image may be stored in a memory (e.g., a trust zone) electrically connected to the fingerprint sensor 140 or may be delivered to the processor 150.

According to various embodiments, the fourth sensing image may be obtained according to a specified condition. The condition may be a condition where a specified condition elapses after obtaining the third sensing image or a condition which is a state where there is no touch input of the user on the display.

Figure 4:
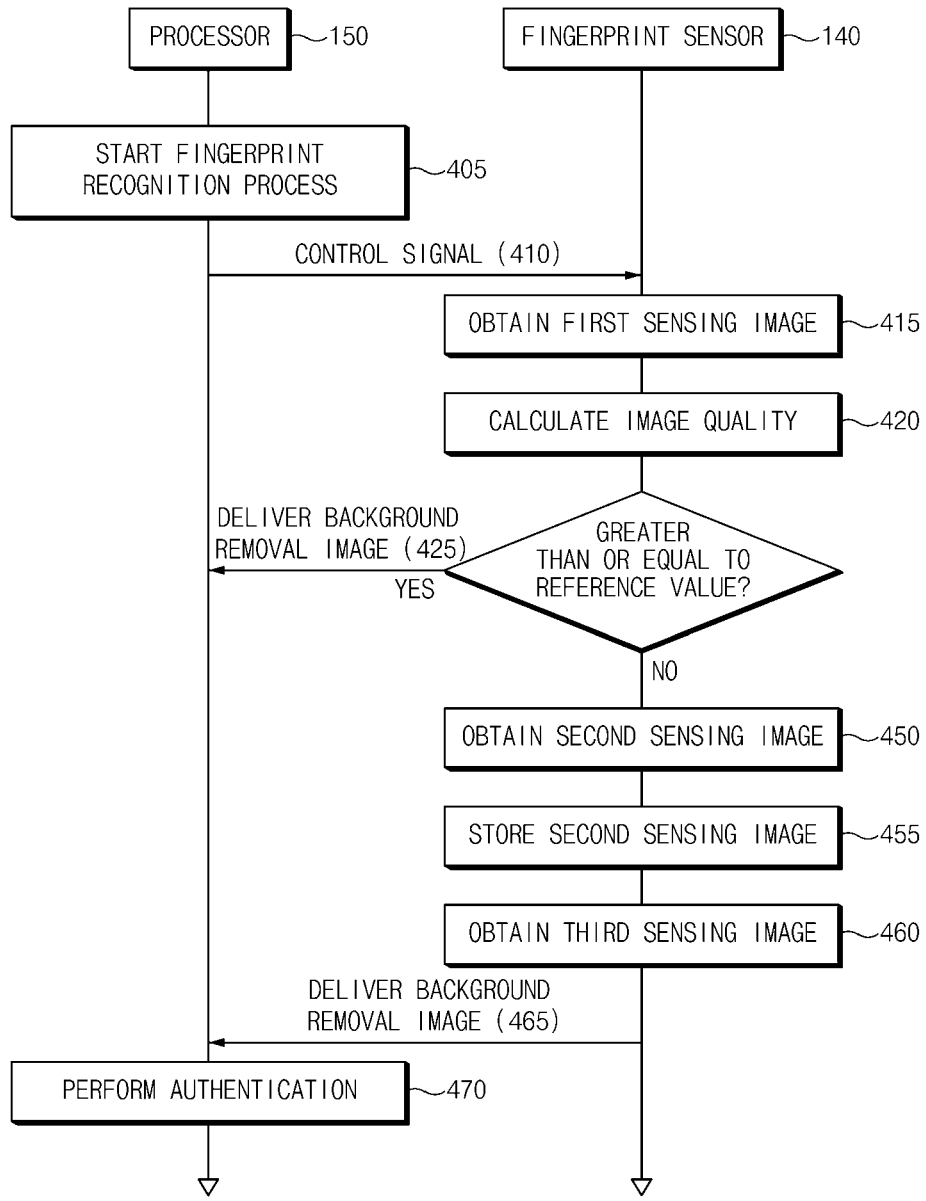
FIG. 4 is a signal sequence diagram between a fingerprint sensor and a processor according to various embodiments.

FIG. 4 is a signal sequence diagram between a fingerprint sensor and a processor according to various embodiments. FIG. 4 is illustrative, but not limited thereto. Some operations may be omitted, or may be performed in another configuration.

Referring to FIG. 4, in operation 405, a processor 150 may start a fingerprint recognition process. For example, the processor 150 may start the fingerprint recognition process by a request of an application, such as payment, banking, or a setting.

In operation 410, the processor 150 may transmit a control signal to perform fingerprint sensing using an ultrasonic wave to a fingerprint sensor 140.

In operation 415, the fingerprint sensor 140 may obtain a first sensing image, in response to the control signal of the processor 150. For example, the fingerprint sensor 140 may generate an ultrasonic wave by means of an ultrasonic wave generating unit and may receive a sound wave (a reflective wave), in which the generated ultrasonic wave is reflected from an external object (e.g., a finger of a user, a glass panel, a protective film, or the like), by means of an ultrasonic wave receiving unit. The fingerprint sensor 140 may convert the received reflective wave into an electrical signal to obtain the first sensing image.

According to an embodiment, the first sensing image may be formed based on a plurality of image frames captured during a specified time (e.g., about 1 second). According to another embodiment, the first sensing image may be formed based on a plurality of image frames captured by a specified number (e.g., about 7).

In operation 420, the fingerprint sensor 140 may calculate image quality for an image (a background removal image) in which a previously stored background image is removed from the first sensing image. The background image may be previously stored in a memory (e.g., a trust zone) electrically connected to the fingerprint sensor 140. The fingerprint sensor 140 may calculate image quality of the background removal image, based on sharpness, contrast, or the like.

In operation 425, when the image quality of the background removal image is greater than or equal to a predetermined reference value, the fingerprint sensor 140 may deliver the background removal image for the first sensing image to the processor 150.

In operation 450, when the image quality of the background removal image is less than the predetermined reference value, the fingerprint sensor 140 may obtain a second sensing image. According to an embodiment, the number of image frames forming the second sensing image may be less than the number of image frames forming the first sensing image.

According to various embodiments, when the image quality of the background removal image is less than the predetermined reference value, the fingerprint sensor 140 may deliver a signal indicating failure to obtain a sensing image to the processor 150. The processor 150 may display a message about fingerprint recognition failure (e.g., "Fingerprint recognition failed. Please put your finger again") on a display 110. When a user changes a location of his or her finger to try to perform fingerprint recognition again (when detecting it through a touch panel), the processor 150 may transmit a control signal to obtain a second sensing image to the fingerprint sensor 140. The fingerprint sensor 140 may obtain the second sensing image, in response to the control signal. For example, when detecting that a fingerprint recognition area 130 is uncontacted after fingerprint recognition fails by a finger which comes into contact with the fingerprint recognition area 130 for the fingerprint recognition, the processor 150 may transmit the control signal to obtain the second sensing image to the fingerprint sensor 140.

According to an embodiment, the fingerprint sensor 140 may remove at least some of image frames forming the second sensing image, through comparison with the first sensing image. The removed image frame may be an image frame including a fingerprint image of the user.

In operation 455, the fingerprint sensor 140 may store the obtained second sensing image in a memory (e.g., a trust zone) storing a background image. In an embodiment, after the fingerprint recognition process is ended, the stored second sensing image may be updated to a newly obtained image.

In operation 460, the fingerprint sensor 140 may obtain a third sensing image, after obtaining the second sensing image. The fingerprint sensor 140 may perform a task of obtaining the third sensing image by a separate control signal of the processor 150 or may perform a task of obtaining the third sensing image within a specified time after obtaining the second sensing image, without the separate control signal.

According to an embodiment, the number of image frames forming the third sensing image may be the same as the number of image frames forming the first sensing image.

In operation 465, the fingerprint sensor 140 may deliver a background removal image, in which the second sensing image is removed from the third sensing image, to the processor 150.

In operation 470, the processor 150 may perform authentication associated with biometric information, based on an image received from the fingerprint sensor 140. For example, the processor 150 may extract a feature point of the received background removal image and may compare the extracted feature point with fingerprint information stored in a secure area. The processor 150 may execute a function, such as screen unlock, payment, or banking, based on the compared result.

The process of FIG. 4 is illustrative, but not limited thereto. Some operations of the fingerprint sensor 140 may be performed by the processor 150. For example, operation 420 may be performed by the processor 150.

FIG. 5 illustrates reflection of an ultrasonic wave according to attachment of a protective film according to various embodiments. FIG. 5 is illustrative, but not limited thereto.

Referring to FIG. 5, a fingerprint sensor 140 may generate an ultrasonic wave of a specified frequency by means of an ultrasonic wave generating unit 510. The generated ultrasonic wave may be reflected from an internal object of an electronic device 101 or an external object (e.g., a fingerprint 150 of a user or a protective film 210). For example, the ultrasonic wave generated by the ultrasonic wave generating unit 510 may be reflected along a first path where it is reflected from the fingerprint 150 of the user or a second path where it is reflected from the protective film 210. A first reflective wave P1 reflected along the first path may arrive at the ultrasonic wave receiving unit 520 slower than a second reflective wave P2 reflected along the second path.

According to an embodiment, a processor 150 or the fingerprint sensor 140 may calculate a delay value between the first reflective wave P1 reflected from the fingerprint 150 of the user and the second reflective wave P2 reflected from the protective film 210, based on a first sensing image. The processor 150 or the fingerprint sensor 140 may reflect the delay value to obtain a second sensing image, thus enhancing image quality of the second sensing image. For example, in the process of obtaining the second sensing image, the fingerprint sensor 140 may start to capture an image capture, after a time corresponding to the delay value elapses, from a time when the ultrasonic wave generating unit 510 generates the ultrasonic wave.

Figure 6:
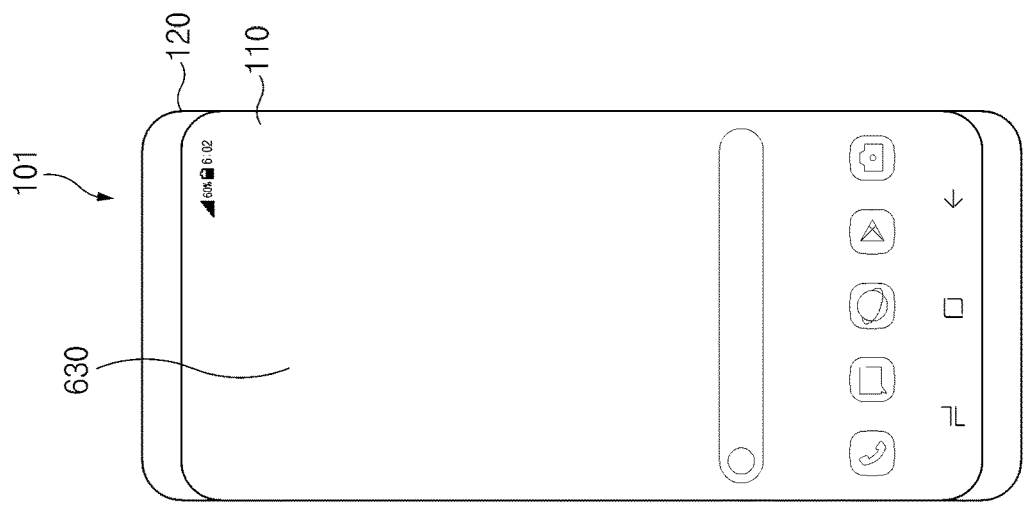
FIG. 6 is a drawing illustrating a user interface in a fingerprint recognition process according to various embodiments.
Figure 6:
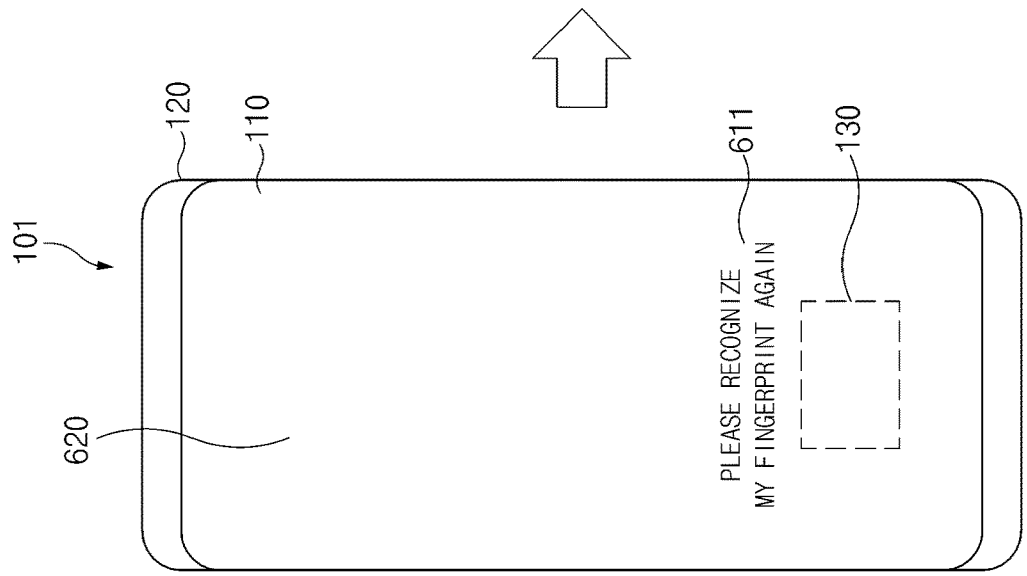
Figure 6:
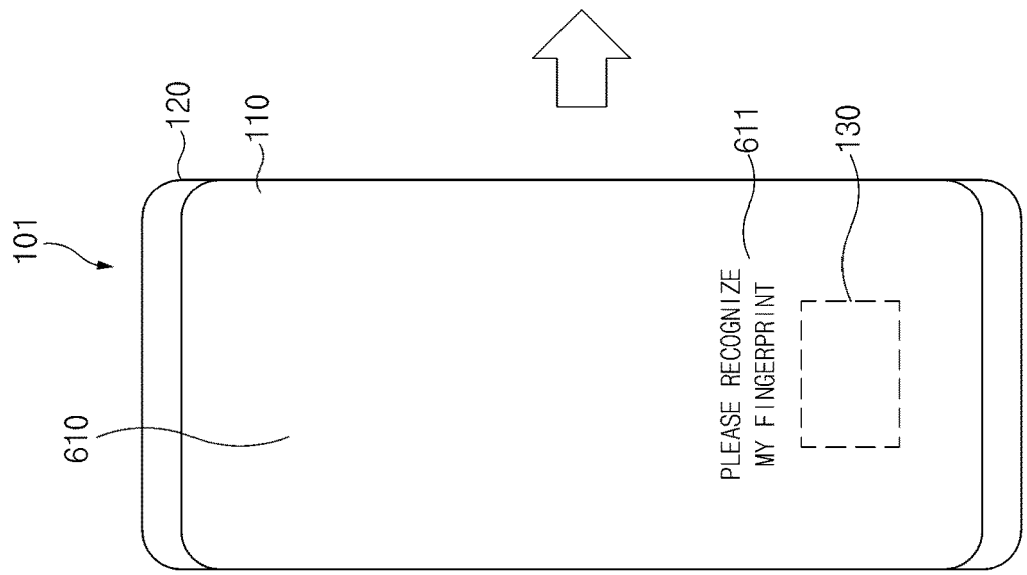

FIG. 6 is a drawing illustrating a user interface in a fingerprint recognition process according to various embodiments. FIG. 6 is illustrative, but not limited thereto.

Referring to FIG. 6, in a first user interface 610, an electronic device 101 may perform fingerprint recognition depending on an in-display type. For example, in a screen lock state, a processor 150 may display a fingerprint recognition area 130 on a display 110. When a fingerprint recognition process starts, the fingerprint recognition area 130 may be displayed in a different color from another region of the display 110 or may be changed to a light emitting state (a state where light is generated from a pixel in the display 110). The processor 150 may display a message 611 starting fingerprint recognition (e.g., "Please recognize my fingerprint") on the display 110.

According to an embodiment, when recognizing a touch input of a user on the fingerprint recognition area 130, the processor 150 may transmit a control signal to perform fingerprint sensing to the fingerprint sensor 140. The fingerprint sensor 140 may obtain a first sensing image, in response to the control signal of the processor 150. The first sensing image may be formed based on a plurality of image frames captured during a specified time (e.g., about 1 second).

When failing in fingerprint recognition based on the first sensing image, the processor 150 may display a second user interface 620.

In the second user interface 620, the processor 150 may display a message 612 for requesting fingerprint recognition again (e.g., "Please recognize my fingerprint again") on the display 110.

According to an embodiment, when removing the touch input of the user from the fingerprint recognition area 130, the processor 150 may transmit a control signal to perform fingerprint sensing to the fingerprint sensor 140. The fingerprint sensor 140 may obtain a second sensing image, in response to the control signal of the processor 150. According to another embodiment, after a specified time (e.g., about 0.5 seconds) elapses after obtaining the first sensing image, without a separate control signal of the processor 150, the fingerprint sensor 140 may obtain the second sensing image.

The number of image frames forming the second sensing image may be less than the number of image frames forming the first sensing image. For example, the first sensing image may be generated by capturing about 7 image frames. On the other hand, the second sensing image may be generated by capturing about 4 image frames.

According to an embodiment, when the touch input of the user is generated again on the fingerprint recognition area 130, the processor 150 may transmit a control signal to perform fingerprint sensing to the fingerprint sensor 140. The fingerprint sensor 140 may obtain a third sensing image, in response to the control signal of the processor 150. According to another embodiment, after a specified time (e.g., about 0.2 seconds) elapses after obtaining the second sensing image, without a separate control signal of the processor 150, the fingerprint sensor 140 may obtain the second sensing image.

The number of image frames forming the third sensing image may be the same as the number of image frames forming the first sensing image. The number of image frames forming the third sensing image may be greater than the number of image frames forming the second sensing image. For example, the third sensing image and the first sensing image may be generated by capturing about 7 image frames. On the other hand, the second sensing image may be generated by capturing about 4 image frames.

When succeeding in fingerprint recognition based on the third sensing image, the processor 150 may display a third user interface 630.

In the third user interface 630, the processor 150 may display content associated with another area of the display 110, on the fingerprint recognition area 130. When not performing the fingerprint recognition process, the fingerprint recognition area 130 may fail to be distinguished from another area of the display 110 in appearance.

Figure 7:
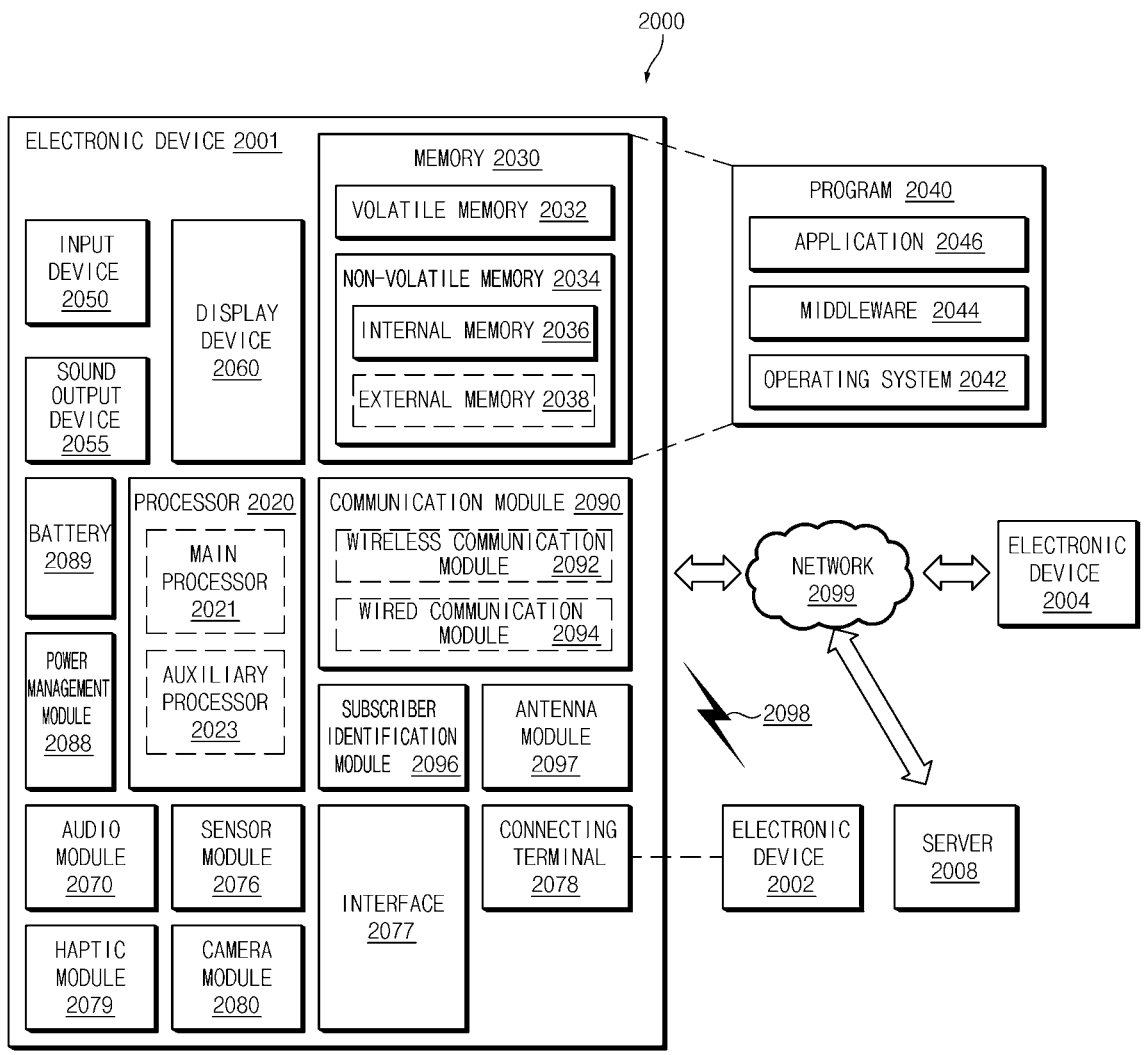
FIG. 7 is a block diagram illustrating an electronic device in a network environment according to various embodiments.

FIG. 7 is a block diagram of an electronic device 2001 in a network environment 2000, according to various embodiments.

Referring to FIG. 7, the electronic device 2001 (e.g., the electronic device 101 of FIG. 1) in the network environment 2000 may communicate with an electronic device 2002 over a first network 2098 (e.g., a short range wireless communication network) or may communicate with an electronic device 2004 or a server 2008 over a second network 2099 (e.g., a long distance wireless communication network). According to an embodiment, the electronic device 2001 may communicate with the electronic device 2004 through the server 2008. According to an embodiment, the electronic device 2001 may include a processor 2020, a memory 2030, an input device 2050, a sound output device 2055, a display device 2060, an audio module 2070, a sensor module 2076, an interface 2077, a haptic module 2079, a camera module 2080, a power management module 2088, a battery 2089, a communication module 2090, a subscriber identification module 2096, or an antenna module 2097. In any embodiment, at least one (e.g., the display device 2060 or the camera module 2080) of the components may be omitted from the electronic device 2001, or one or more other components may be further included in the electronic device 2001. In any embodiment, some of the components may be implemented with a single integrated circuit. For example, the sensor module 2076 (e.g., a fingerprint sensor, an iris sensor, or an illumination sensor) may be embedded in the display device 2060 (e.g., a display).

The processor 2020 may execute, for example, software (e.g., a program 2040) to control at least one other component (e.g., a hardware or software component) of the electronic device 2001 connected to the processor 2020, and may perform various data processing or operations. According to an embodiment, as at least a part of the data processing or operations, the processor 2020 may load a command or data received from any other component (e.g., the sensor module 2076 or the communication module 2090) to a volatile memory 2032, may process the command or data stored in the volatile memory 2032, and may store processed data in a nonvolatile memory 2034. According to an embodiment, the processor 2020 may include a main processor 2021 (e.g., a central processing unit or an application processor) and an auxiliary processor 2023 (e.g., a graphic processing device, an image signal processor, a sensor hub processor, or a communication processor), which may be operated independently of or together with the main processor 2021. Additionally or alternatively, the auxiliary processor 2023 may be configured to use lower power than the main processor 2021 or to be specialized for a specified function. The auxiliary processor 2023 may be implemented separately from the main processor 2021 or may be implemented as a part of the main processor 2021.

The auxiliary processor 2023 may control at least a part of a function or states associated with at least one component (e.g., the display device 2060, the sensor module 2076, or the communication module 2090) of the electronic device 2001, for example, instead of the main processor 2021 while the main processor 2021 is in an inactive (e.g., sleep) state and together with the main processor 2021 while the main processor 2021 is in an active (e.g., an application execution) state. According to an embodiment, the auxiliary processor 2023 (e.g., an image signal processor or a communication processor) may be implemented as a part of any other component (e.g., the camera module 2080 or the communication module 2090) which is functionally (or operatively) associated with the auxiliary processor 2023. The memory 2030 may store various data which are used by at least one component (e.g., the processor 2020 or the sensor module 2076) of the electronic device 2001. The data may include, for example, software (e.g., the program 2040), or input data or output data associated with a command of the software. The memory 2030 may include the volatile memory 2032 or the nonvolatile memory 2034.

The program 2040 may be stored in the memory 2030 as software, and may include, for example, an operating system 2042, a middleware 2044, or an application 2046.

The input device 2050 may receive a commands or data which will be used by a component (e.g., the processor 2020) of the electronic device 2001, from the outside (e.g., a user) of the electronic device 2001. The input device 2050 may include, for example, a microphone, a mouse, or a keyboard.

The sound output device 2055 may output a sound signal to the outside of the electronic device 2001. The sound output device 2055 may include, for example, a speaker or a receiver. The speaker may be used for a general purpose such as multimedia play or recording play, and the receiver may be used to receive an incoming call. According to an embodiment, the receiver may be implemented separately from the speaker or may be implemented as a part of the speaker.

The display device 2060 may visually provide information to the outside (e.g., the user) of the electronic device 2001. The display device 2060 may include, for example, a display, a hologram device, or a control circuit for controlling a projector and a corresponding device. According to an embodiment, the display device 2060 may include a touch circuitry configured to sense a touch, or a sensor circuitry (e.g., a pressure sensor) configured to measure the strength of force generated by the touch.

The audio module 2070 may convert sound to an electrical signal, or reversely, may convert an electrical signal to sound. According to an embodiment, the audio module 2070 may obtain sound through the input device 2050, or may output sound through the sound output device 2055, or through an external electronic device (e.g., the electronic device 2002) (e.g., a speaker or a headphone) directly or wirelessly connected with the electronic device 2001.

The sensor module 2076 may sense an operation state (e.g., power or a temperature) of the electronic device 2001 or an external environment state (e.g., a user state), and may generate an electrical signal or a data value corresponding the sensed state. According to an embodiment, the sensor module 2076 may include, for example, a gesture sensor, a grip sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 2077 may support one or more specified protocols that may be used to directly and wirelessly connect the electronic device 2001 with an external electronic device (e.g., the electronic device 2002). According to an embodiment, the interface 2077 may include, for example, a high definition multimedia interface (HDMI), a universal serial bus (USB) interface, a secure digital (SD) card interface, or an audio interface.

A connection terminal 2078 may include a connector that may allow the electronic device 2001 to be physically connected with an external electronic device (e.g., the electronic device 2002). According to an embodiment, the connection terminal 2078 may include, for example, a HDMI connector, a USB connector, a SD card connector, or an audio connector (e.g., a headphone connector).

The haptic module 2079 may convert an electrical signal to a mechanical stimulation (e.g., vibration or movement) or an electrical stimulation which the user may perceive through the sense of touch or the sense of movement. According to an embodiment, the haptic module 2079 may include, for example, a motor, a piezoelectric sensor, or an electrical stimulation device.

The camera module 2080 may photograph a still image and a video. According to an embodiment, the camera module 2080 may include one or more lenses, image sensors, image signal processors, or flashes (or electrical flashes).

The power management module 2088 may manage the power which is supplied to the electronic device 2001. According to an embodiment, the power management module 2088 may be implemented, for example, as at least a part of a power management integrated circuit (PMIC).

The battery 2089 may power at least one component of the electronic device 2001. According to an embodiment, the battery 2089 may include, for example, a primary cell not recharged, a secondary cell rechargeable, or a fuel cell.

The communication module 2090 may establish a direct (or wired) communication channel or a wireless communication channel between the electronic device 2001 and an external electronic device (e.g., the electronic device 2002, the electronic device 2004, or the server 2008) or may perform communication through the established communication channel. The communication module 2090 may include one or more communication processors which is operated independently of the processor 2020 (e.g., an application processor) and supports direct (or wired) communication or wireless communication. According to an embodiment, the communication module 2090 may include a wireless communication module 2092 (e.g., a cellular communication module, a short range wireless communication module, or a global navigation satellite system (GNSS) communication module) or a wired communication module 2094 (e.g., a local area network (LAN) communication module or a power line communication module). A corresponding communication module of such communication modules may communicate with an external electronic device over the first network 2098 (e.g., a short range communication network such as Bluetooth, Wi-Fi direct, or infrared data association (IrDA)) or the second network 2099 (e.g., a long distance communication network such as a cellular network, an Internet, or a computer network (e.g., LAN or WAN)). The above-described kinds of communication modules may be integrated in one component (e.g., a single chip) or may be implemented with a plurality of components (e.g., a plurality of chips) which are independent of each other.

According to an embodiment, the wireless communication module 2092 may distinguish and authenticate the electronic device 2001 in the communication network using user information stored in the subscriber identification module 2096.

The antenna module 2097 may include one or more antennas for transmitting or receiving signals or power to the outside. According to an embodiment, the communication module 2090 (e.g., the wireless communication module 2092) may transmit a signal to an external electronic device or receive a signal from an external electronic device through an antenna suitable for a communication method.

At least some of the components may be connected to each other through a communication scheme (e.g., a bus, a general purpose input and output (GPIO), a serial peripheral interface (SPI), or a mobile industry processor interface (MIPI)) between peripheral devices and may exchange signals (e.g., commands or data) with each other.

According to an embodiment, a command or data may be transmitted or received (or exchanged) between the electronic device 2001 and the external electronic device 2004 through the server 2008 connecting to the second network 2099. Each of the electronic devices 2002 and 2004 may be a device, the kind of which is the same as or different from a kind of the electronic device 2001. According to an embodiment, all or a part of operations to be executed in the electronic device 2001 may be executed in one or more external devices of the external electronic devices 2002, 2004, or 2008. For example, in the case where the electronic device 2001 should perform any function or service automatically or in response to a request from the user or any other device, the electronic device 2001 may request one or more external electronic devices to perform at least a part of the function or service, instead of internally executing the function or service or additionally. The one or more external electronic devices which receive the request may execute at least a part of the function or service thus requested or an additional function or service associated with the request, and may provide a result of the execution to the electronic device 2001. The electronic device 2001 may process received result as it is or additionally, and may provide a result of the processing as at least a part of the response to the request. To this end, for example, a cloud computing, distributed computing, or client-server computing technology may be used.

According to various embodiments, an electronic device (e.g., the electronic device 101 of FIG. 1) may include a display (e.g., the display 110 of FIG. 1), a fingerprint sensor (e.g., the fingerprint sensor 140 of FIG. 1) positioned under a specified area of the display; and a processor (e.g., the processor 150 of FIG. 1), wherein the processor is configured to obtain a first image associated with an external object corresponding to a first input using the fingerprint sensor set to a first value, based on the first input associated with biometric information through the specified area, when a state of the first image meets a first condition, perform authentication associated with the biometric information based at least on the first image, and when the state of the first image meets a second condition, obtain a second image obtained through the specified area using the fingerprint sensor, during a first time when there is no input associated with the biometric information, obtain a third image through the specified area, using the fingerprint sensor adjusted from the first value to a second value, and perform authentication associated with the biometric information based on the second image and the third image.

According to various embodiments, the fingerprint sensor captures a first number of image frames to obtain the first image and captures a second number of image frames less than the first number of image frames to obtain the second image.

According to various embodiments, the processor is configured to obtain a fourth image through the specified area using the fingerprint sensor, during the first time.

According to various embodiments, the fingerprint sensor captures the first number of image frames to obtain the fourth image.

According to various embodiments, the fingerprint sensor includes an ultrasonic wave generating unit and an ultrasonic wave receiving unit, outputs an ultrasonic wave of a specified frequency towards the specified area using the ultrasonic wave generating unit, and obtains the first image, the second image, or the third image based on a reflective sound wave corresponding to an ultrasonic wave of the specified frequency, the ultrasonic wave being received using the ultrasonic wave receiving unit.

According to various embodiments, the processor is configured to adjust a setting of the fingerprint sensor in conjunction with a delay of a sound wave corresponding to a thickness or material of a protective film attached to the display.

According to various embodiments, the processor is configured to obtain the second image, using the fingerprint sensor adjusted from the first value to the second value.

According to various embodiments, the processor is configured to recognize attachment of a protective film attached to the display, by means of a separate sensor, and obtain the second image.

According to various embodiments, the electronic further includes a memory electrically connected to the fingerprint sensor, wherein the fingerprint sensor stores the second image in the memory.

According to various embodiments, the processor is configured to when obtaining a fourth image obtained through the specified area using the fingerprint sensor, during the first time, change the second image stored in the memory to the fourth image to store the fourth image.

According to various embodiments, an electronic device may include a display, a fingerprint sensor positioned under a specified area of the display, and a processor, wherein the fingerprint sensor is configured to capture a first number of image frames to obtain a first image, using an ultrasonic wave reflected from an external object in a state where the fingerprint sensor is set to a first value, identify a state of the first image, capture a second number of image frames less than the first number of image frames to obtain a second image, based on the identified state, and capture the first number of image frames to obtain a third image, using an ultrasonic wave reflected from the external object in a state where the fingerprint sensor is adjusted from the first value to a second value, and wherein the processor is configured to perform authentication for the external object, based on the second image and the third image.

According to various embodiments, the electronic device further includes a memory storing a background image associated with the fingerprint sensor, wherein the fingerprint sensor identifies a state of the first image, based at least on the first image and the background image.

According to various embodiments, the fingerprint sensor changes the background image stored in the memory to the second image to store the second image.

According to various embodiments, after obtaining the third image, the fingerprint sensor captures the first number of image frames to obtain a fourth image, in a state where the external object does not come into contact with the specified area of the display.

According to various embodiments, the fingerprint sensor changes and stores the second image stored in the memory into the fourth image.

According to various embodiments, a fingerprint recognition method is performed in an electronic device. The fingerprint recognition method may includes obtaining a first image associated with an external object corresponding to a first input using a fingerprint sensor positioned under a specified area of a display and set to a first value, based on the first input in conjunction with biometric information through the specified area, when a state of the first image meets a first condition, performing authentication associated with the biometric information based at least on the first image, when the state of the first image meets a second condition, obtaining a second image obtained through the specified area using the fingerprint sensor, during a first time when there is no input associated with the biometric, obtaining a third image obtained through the specified area, using the fingerprint sensor adjusted from the first value to a second value, and performing authentication associated with the biometric information based on the second image and the third image.

According to various embodiments, the operation of obtaining the first image includes an operation of capturing a first number of image frames using the fingerprint sensor.

According to various embodiments, the operation of obtaining the second image includes an operation of capturing a second number of image frames less than the first number by using the fingerprint sensor.

According to various embodiments, the operation of obtaining the second image includes storing the second image in a memory electrically connected to the fingerprint sensor.

According to various embodiments, the operation of obtaining the second image includes an operation of recognizing attachment of a protective film attached to the display through a separate sensor, and obtaining the second image.

Each of components (e.g., a module or a program) may include a single entity or a plurality of entities; some of the above-described corresponding sub components may be omitted, or any other sub component may be further included in various embodiments. Alternatively additionally, some components (e.g., a module or a program) may be combined with each other so as to form one entity, so that the functions of the components may be performed in the same manner as before the combination. According to various embodiments, operations executed by modules, program modules, or other components may be executed by a successive method, a parallel method, a repeated method, or a heuristic method. Alternatively, at least some of the operations may be executed in another order or may be omitted, or any other operation may be added.

The invention claimed is:

1. An electronic device, comprising:
a display;
a fingerprint sensor positioned under a specified area of the display; and
a processor,
wherein the processor is configured to:
obtain a first image associated with an external object corresponding to a first input using the fingerprint sensor set to a first value, based on the first input associated with biometric information through the specified area;
when a state of the first image meets a first condition, perform authentication associated with the biometric information based at least on the first image;
when the state of the first image meets a second condition, obtain a second image through the specified area using the fingerprint sensor, during a first time when there is no input associated with the biometric information;

obtain a third image through the specified area, using the fingerprint sensor adjusted from the first value to a second value based on a delay of a sound wave corresponding to a thickness or material of a protective film attached to the display; and perform authentication associated with the biometric information based on the second image and the third image.

2. The electronic device of claim 1, wherein the fingerprint sensor captures a first number of image frames to obtain the first image and captures a second number of image frames less than the first number of image frames to obtain the second image.

3. The electronic device of claim 2, wherein the processor is configured to:

obtain a fourth image through the specified area using the fingerprint sensor, during the first time.

4. The electronic device of claim 3, wherein the fingerprint sensor captures the first number of image frames to obtain the fourth image.

5. The electronic device of claim 1, wherein the fingerprint sensor includes an ultrasonic wave generating unit and an ultrasonic wave receiving unit, outputs an ultrasonic wave of a specified frequency towards the specified area using the ultrasonic wave generating unit, and obtains the first image, the second image, or the third image based on a reflective sound wave corresponding to an ultrasonic wave of the specified frequency, the ultrasonic wave being received using the ultrasonic wave receiving unit.

6. The electronic device of claim 1, wherein the processor is configured to:

obtain the second image, using the fingerprint sensor adjusted from the first value to the second value.

7. The electronic device of claim 1, wherein the processor is configured to:

recognize attachment of a protective film attached to the display, by means of a separate sensor, and obtain the second image.

8. The electronic device of claim 1, further comprising:
a memory electrically connected to the fingerprint sensor,
wherein the fingerprint sensor stores the second image in the memory.

9. The electronic device of claim 8, wherein the processor is configured to:

when obtaining a fourth image through the specified area using the fingerprint sensor, during the first time, change the second image stored in the memory to the fourth image to store the fourth image.

10. An electronic device, comprising:
a display;
a fingerprint sensor positioned under a specified area of the display; and
a processor,
wherein the fingerprint sensor is configured to:
capture a first number of image frames to obtain a first image, using an ultrasonic wave reflected from an external object corresponding to a first input, in a state where the fingerprint sensor is set to a first value, based on the first input associated with biometric information through the specified area;

identify a state of the first image;

capture a second number of image frames less than the first number of image frames to obtain a second image, based on the identified state, during a first time when there is no input associated with the biometric information; and capture the first number of image frames to obtain a third image, using an ultrasonic wave reflected from the external object in a state where the fingerprint sensor is adjusted from the first value to a second value based on a delay of a sound wave corresponding to a thickness or material of a protective film attached to the display, and wherein the processor is configured to:

perform authentication associated with the biometric information for the external object, based on the second image and the third image.

11. The electronic device of claim 10, further comprising:
a memory storing a background image associated with the fingerprint sensor,
wherein the fingerprint sensor identifies theft state of the first image, based at least on the first image and the background image.

12. The electronic device of claim 11, wherein the fingerprint sensor changes the background image stored in the memory to the second image to store the second image.

13. The electronic device of claim 12, wherein, after obtaining the third image, the fingerprint sensor captures the first number of image frames to obtain a fourth image, in a state where the external object does not come into contact with the specified area of the display.

14. A fingerprint recognition method performed in an electronic device, the fingerprint recognition method comprising:

obtaining a first image associated with an external object corresponding to a first input using a fingerprint sensor positioned under a specified area of a display and set to a first value, based on the first input in conjunction with biometric information through the specified area;

when a state of the first image meets a first condition, performing authentication associated with the biometric information based at least on the first image;

when the state of the first image meets a second condition, obtaining a second image through the specified area using the fingerprint sensor, during a first time when there is no input associated with the biometric;

obtaining a third image through the specified area, using the fingerprint sensor adjusted from the first value to a second value based on a delay of a sound wave corresponding to a thickness or material of a protective film attached to the display; and performing authentication associated with the biometric information based on the second image and the third image.

* * * * *